United States Patent
Yaacobi

(10) Patent No.: US 9,157,806 B2
(45) Date of Patent: Oct. 13, 2015

(54) SYSTEM AND METHOD FOR CHANGING SPECTRAL RANGE OF A CRYOGENICALLY COOLED DETECTOR

(75) Inventor: Ami Yaacobi, Ramat Ishai (IL)

(73) Assignee: RAFAEL ADVANCED DEFENSE SYSTEMS LTD., Haifa (IL)

(*) Notice: Subject to any disclaimer, the term of this patent is extended or adjusted under 35 U.S.C. 154(b) by 1199 days.

(21) Appl. No.: 13/029,174

(22) Filed: Feb. 17, 2011

(65) Prior Publication Data

US 2011/0199605 A1   Aug. 18, 2011

(30) Foreign Application Priority Data

Feb. 18, 2010 (IL) .......................................... 204025

(51) Int. Cl.
*G01N 21/35* (2014.01)
*G01J 5/06* (2006.01)
*G01J 5/08* (2006.01)
*G01J 5/60* (2006.01)

(52) U.S. Cl.
CPC .. *G01J 5/06* (2013.01); *G01J 5/061* (2013.01); *G01J 5/08* (2013.01); *G01J 5/084* (2013.01); *G01J 5/0809* (2013.01); *G01J 5/602* (2013.01)

(58) Field of Classification Search
CPC .......... G01N 21/35; G01J 3/00; G01J 3/0229; G01J 3/0286; G01J 3/061
USPC ....................................................... 250/338.1
See application file for complete search history.

(56) References Cited

U.S. PATENT DOCUMENTS

| | | | | |
|---|---|---|---|---|
| 4,751,571 A * | 6/1988 | Lillquist | ...................... | 348/164 |
| 4,820,923 A * | 4/1989 | Wellman | ...................... | 250/352 |
| 4,839,009 A * | 6/1989 | Pollock et al. | ........... | 204/157.48 |
| 4,990,322 A * | 2/1991 | Pollock et al. | ............. | 423/499.4 |
| 4,990,782 A * | 2/1991 | Wellman et al. | ............... | 250/352 |
| 4,996,427 A * | 2/1991 | Noble et al. | .................... | 250/332 |
| 5,075,553 A * | 12/1991 | Noble et al. | .................... | 250/352 |
| 5,177,364 A * | 1/1993 | Gowlett et al. | ............... | 250/352 |
| 5,378,892 A * | 1/1995 | Levy et al. | ..................... | 250/352 |
| 5,408,100 A * | 4/1995 | Gallivan | ........................ | 250/352 |
| 5,534,700 A * | 7/1996 | McGlynn et al. | .............. | 250/353 |
| 5,737,119 A * | 4/1998 | Mladjan et al. | ................ | 359/353 |
| 5,966,945 A * | 10/1999 | Mengel et al. | .................. | 62/51.1 |
| 6,057,550 A * | 5/2000 | Thoma et al. | .................. | 250/352 |
| 6,144,031 A * | 11/2000 | Herring et al. | ................ | 250/352 |
| 6,310,347 B1 * | 10/2001 | Shu et al. | .................. | 250/339.07 |
| 6,677,588 B1 * | 1/2004 | Granneman | ............... | 250/338.1 |

(Continued)

OTHER PUBLICATIONS

Machine Translation of 5-248943.*

*Primary Examiner* — Marcus Taningco
*Assistant Examiner* — Djura Malevic
(74) *Attorney, Agent, or Firm* — Mark M. Friedman

(57) ABSTRACT

The provided optical system allows selective spectral transfer of radiation, and provides a reflecting field of view at an undesired range directed towards cold surfaces. A removable spectral filter having a high transmittance at a first spectral range and a low transmittance at a second spectral range is disposed outside a cold shield. A reflective surface faces the detecting device and provides the detector a reflecting field of view at the second spectral range directed back towards the cold shield, and a blackened cold skirt thereof. Alternatively, a dichroic mirror is disposed inside the cold shield and has a high reflectance at a first spectral range and a high transmittance at a second range. The detecting device includes a first and a second arm of the cold shield to accommodate respective optical channels.

12 Claims, 6 Drawing Sheets

(56) References Cited

U.S. PATENT DOCUMENTS

| | | | |
|---|---|---|---|
| 7,002,154 B2* | 2/2006 | Wellman et al. | 250/352 |
| 7,105,821 B1* | 9/2006 | Kennedy et al. | 250/339.07 |
| 7,332,720 B2* | 2/2008 | Minarik et al. | 250/352 |
| 7,491,936 B2* | 2/2009 | Barron | 250/330 |
| 7,703,932 B2* | 4/2010 | Cook | 359/858 |
| 8,101,918 B1* | 1/2012 | Mercado | 250/352 |
| 8,254,018 B2* | 8/2012 | Wellman et al. | 359/359 |
| 8,507,866 B2* | 8/2013 | Cook | 250/339.07 |
| 2003/0025083 A1* | 2/2003 | Kaufman | 250/353 |
| 2004/0211907 A1* | 10/2004 | Wellman et al. | 250/353 |
| 2004/0212877 A1* | 10/2004 | Borchard | 359/359 |
| 2005/0078208 A1* | 4/2005 | Minarik et al. | 348/373 |
| 2005/0180026 A1* | 8/2005 | Pohle | 359/726 |
| 2006/0082681 A1* | 4/2006 | Minarik et al. | 348/373 |
| 2006/0180765 A1* | 8/2006 | Wolske | 250/352 |
| 2008/0266687 A1* | 10/2008 | Cook | 359/859 |
| 2010/0284570 A1* | 11/2010 | Grimberg | 382/103 |
| 2011/0169962 A1* | 7/2011 | Gat et al. | 348/164 |
| 2011/0279681 A1* | 11/2011 | Cabib et al. | 348/164 |
| 2012/0105646 A1* | 5/2012 | Oster et al. | 348/164 |

* cited by examiner

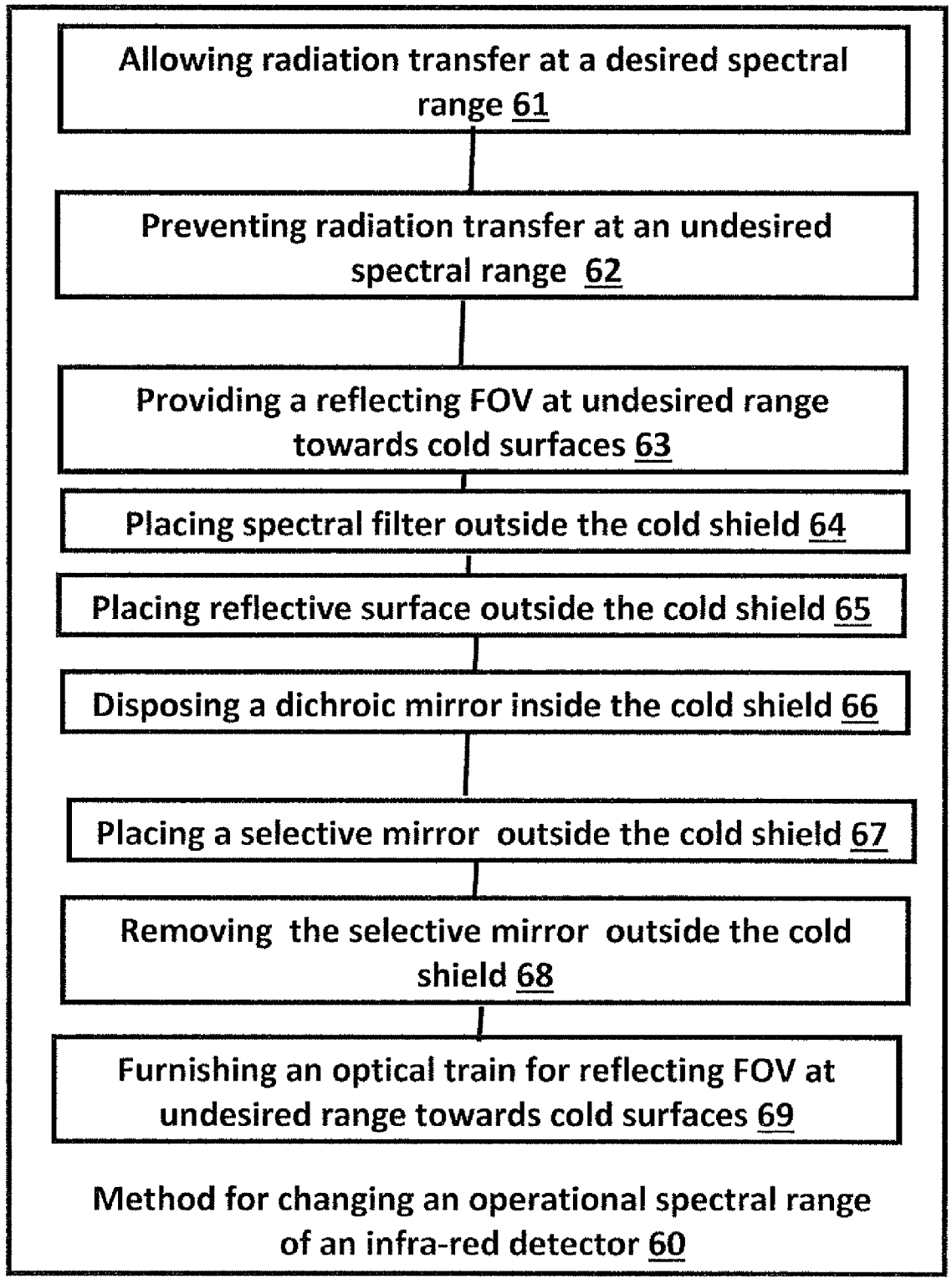

SYSTEM AND METHOD FOR CHANGING SPECTRAL RANGE OF A CRYOGENICALLY COOLED DETECTOR

CROSS REFERENCE

The current application claims the priority rights of Israeli patent application No. 204,025 entitled "CHANGING SPECTRAL RANGE OF CRYOGENICALLY COOLED DETECTOR" filed Feb. 18, 2010, by the current inventor.

BACKGROUND OF THE INVENTION

1. Field of the Invention

The invention is in the field of infra-red cryogenically cooled detectors, used to image thermal objects disposed in certain field of view. In special, the current application deals with changing detected spectral range by actions done outside cold shield of the detector.

2. Description of Related Art

An infra-red cryogenically cooled detecting device 17 of the prior art is illustrated in FIG. 1. An infra-red detector 5 is disposed on a cold finger 30, and placed within a cold shield 1. A cold filter 14 is thermally coupled to cold shield 1, and filters the radiation outside the detecting range of detector 5 to prevent undesired heating of the detector. Cold filter 14 may have even a smaller spectral range as needed by a specific task.

Cold shield 1 is located within a vacuum cell or Dewar Detector Cooler (hereafter DDC) 9. The incoming radiation from a certain field of view (FOV), which includes the object desired for imaging, enters vacuum cell 9 through vacuum tight window 32.

Sometimes, there is a demand to operate in two different spectral ranges. Implementation of this demand entails difficulty because the spectral range is determined by filter 14 which is cooled by rigid attachment, by welding for example, to cold shield 1 situated within DDC 9. Dewar 9 itself is drawn to high vacuum to reduce heat flow. It is also problematic to employ moving parts within the vacuum due to generation of dust and problems of lubrication. It is therefore not simple to exchange the filter within vacuum cell 9.

According to the conventional approach, it is assumed that any location of the spectral filter outside Dewar 9 would lead to problematic noise and degradation of the images due to thermal emissions from the filter itself and/or thermal energy from the environment incident on the detector side of the filter and reflected onto a detector or a detector array 5.

The present invention describes several devices and corresponding methods to operate a thermal imaging system switchably in several spectral ranges using a single cooled detector, whereas switching between spectral ranges is done completely outside the Dewar with no particular difficulty, and without significant loss of sensitivity or significant addition of undesired radiation.

BRIEF SUMMARY OF THE INVENTION

It is provided according to some embodiments of the current invention, an optical system for changing an operational spectral range of a cryogenically cooled infra-red detecting device. The device has an infra-red detector disposed within a cold shield and adapted for receiving incoming radiation. The optical system allows transfer to the detector of incoming radiation at a desired spectral range while preventing transfer thereof at an undesired spectral range, and provides a reflecting field of view at the undesired spectral range directed towards cold surfaces.

In some embodiments, the system includes a removable spectral filter disposed outside the cold shield. The spectral filter has a high transmittance at a first spectral range and a substantially lower transmittance for a second spectral range. Preferably the high transmittance is higher than 70% and the low transmittance is lower than 20%.

In some embodiments, a reflective surface faces the detecting device and providing the detector a reflecting field of view at the second spectral range directed towards the cold shield. Preferably, a blackened cold skirt surrounds a coupling window of the cold shield, and the reflective surface provides the detector a reflecting field of view directed towards the cold shield and the blackened cold skirt.

Alternatively, the reflective surface is a concave reflecting surface facing the detecting device.

In some embodiments, a dichroic mirror is disposed inside the cold shield in front of an infra-red detector. The dichroic mirror has a high reflectance at a first spectral range and a high transmittance at a second spectral range. The detecting device includes a first arm and a second arm of the cold shield to accommodate respective optical channels for the first spectral range and for the second spectral range. Preferably, a removable selective mirror having a high reflectance at the first spectral range is disposed outside the cold shield. Most preferably, the removable selective mirror prevents reception by the detecting device of incoming radiation at the second spectral range.

In some embodiments, an optical train provides a reflecting field of view at the undesired spectral range directed towards cold surfaces. Preferably, the cold surface is a blackened surface of the cold shield. Alternatively, the cold surface is a thermo-electric cooler.

It is provided according to some embodiments of the current invention, a method for changing an operational spectral range of a cryogenically cooled infra-red detecting device. The method includes a step of allowing transfer to the detector of incoming radiation at a desired spectral range, a step of preventing transfer thereof at an undesired spectral range, and a step of providing a reflecting field of view at the undesired spectral range directed towards at least one cold surface.

In some embodiments, the method includes placing and removing spectral filter outside the cold shield. The spectral filter has a high transmittance at a first spectral range and a substantially lower transmittance for a second spectral range.

In some embodiments, the method includes placing and removing a reflective surface facing the detecting device for providing the detector a reflecting field of view at the second spectral range directed towards the cold shield.

In some embodiments, the method includes disposing a dichroic mirror inside the cold shield in front of an infra-red detector. The dichroic mirror has a high reflectance at a first spectral range and a high transmittance at a second spectral range. The detecting device includes a first arm and a second arm of the cold shield to accommodate respective optical channels for the first spectral range and for the second spectral range. Preferably, the method further includes placing and removing a selective mirror outside the cold shield, whereas the removable selective mirror has a high reflectance at the first spectral range. Preferably, the method includes a step of providing an optical train for providing a reflecting field of view at the undesired spectral range directed towards cold surfaces.

It is provided an optical system for controlling radiation provided to a cryogenically cooled detecting device equipped with a cold shield. The detecting device being adapted to detect the incoming radiation from a certain field of view. The optical system blocks portion of the field of view of the incoming radiation from arriving the detecting device, and provides a reflecting field of view compatible with the blocked portion directed towards cold surfaces. Preferably, a substantially circular aperture is used for blocking portion of the incoming radiation, and a reflecting surface is used for reflecting field of view compatible with the blocked portion directed towards at least one cold surface. Most preferably, a blackened cold skirt surrounds a coupling window of the cold shield and the reflective surface, and the reflecting surface provides the detector a reflecting field of view directed towards the cold shield and the blackened cold skirt.

BRIEF DESCRIPTION OF THE DRAWINGS

The subject matter regarded as the invention is particularly pointed out and distinctly claimed in the concluding portion of the specification. The invention, however, both as to system organization and method of operation, together with features and advantages thereof, may best be understood by reference to the following detailed description when read with the accompanied drawings in which:

FIG. 6 is a flow chart of a method for changing an operational spectral range of an infra-red detector.

DETAILED DESCRIPTION OF THE INVENTION

Figure 1:
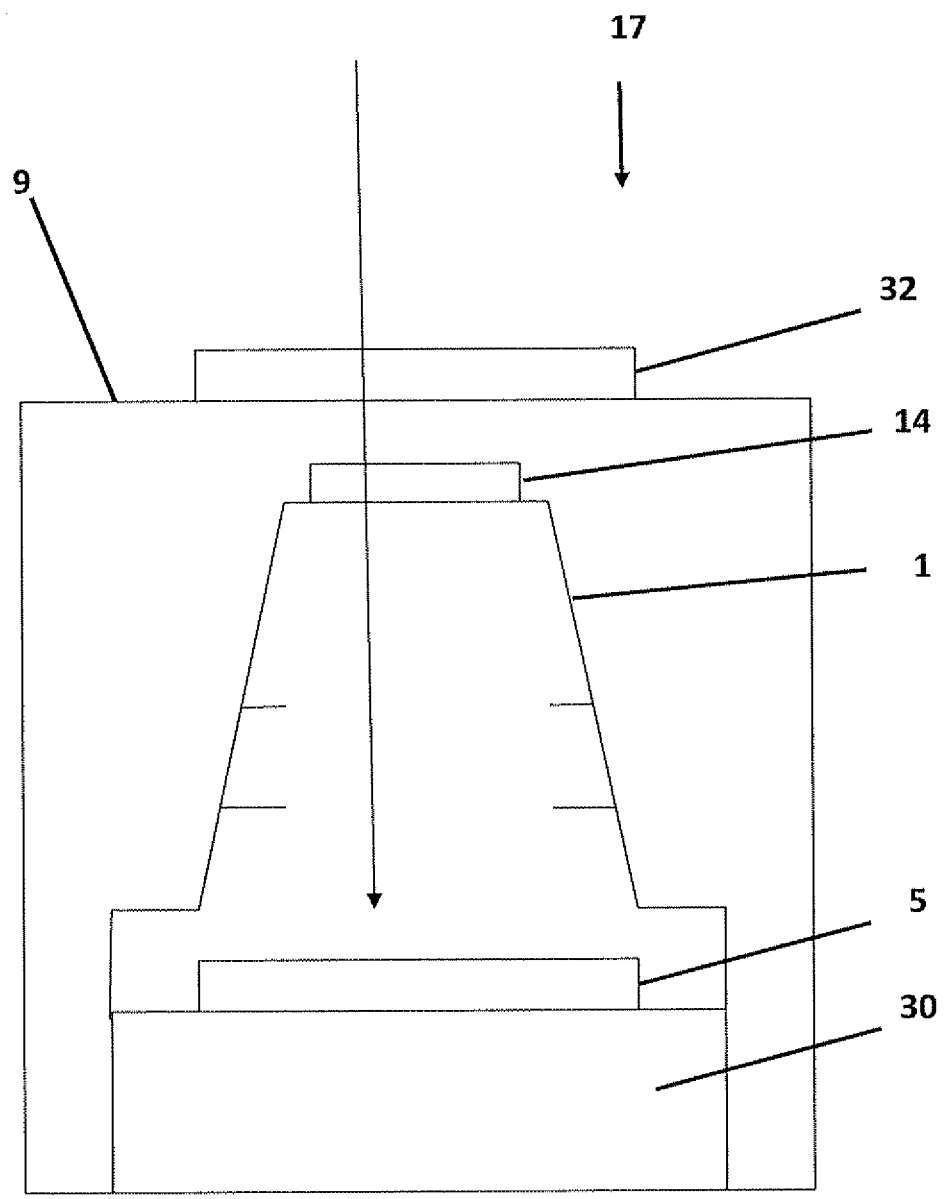
FIG. 1 (Prior Art) is a schematic drawing of a cold detector according to the prior art whereas the spectral range is unchangable during task.

The present invention will now be described in terms of specific example embodiments. It is to be understood that the invention is not limited to the example embodiments disclosed. It should also be understood that not every feature of the methods and systems handling the described device is necessary to implement the invention as claimed in any particular one of the appended claims. Various elements and features of devices are described to fully enable the invention. It should also be understood that throughout this disclosure, where a method is shown or described, the steps of the method may be performed in any order or simultaneously, unless it is clear from the context that one step depends on another being performed first.

Before explaining several embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The systems, methods, and examples provided herein are illustrative only and not intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

In the following, several embodiments are described.
Cold Skirt Embodiments (FIGS. 2a,2b,3a,3b)

Figure 2A:
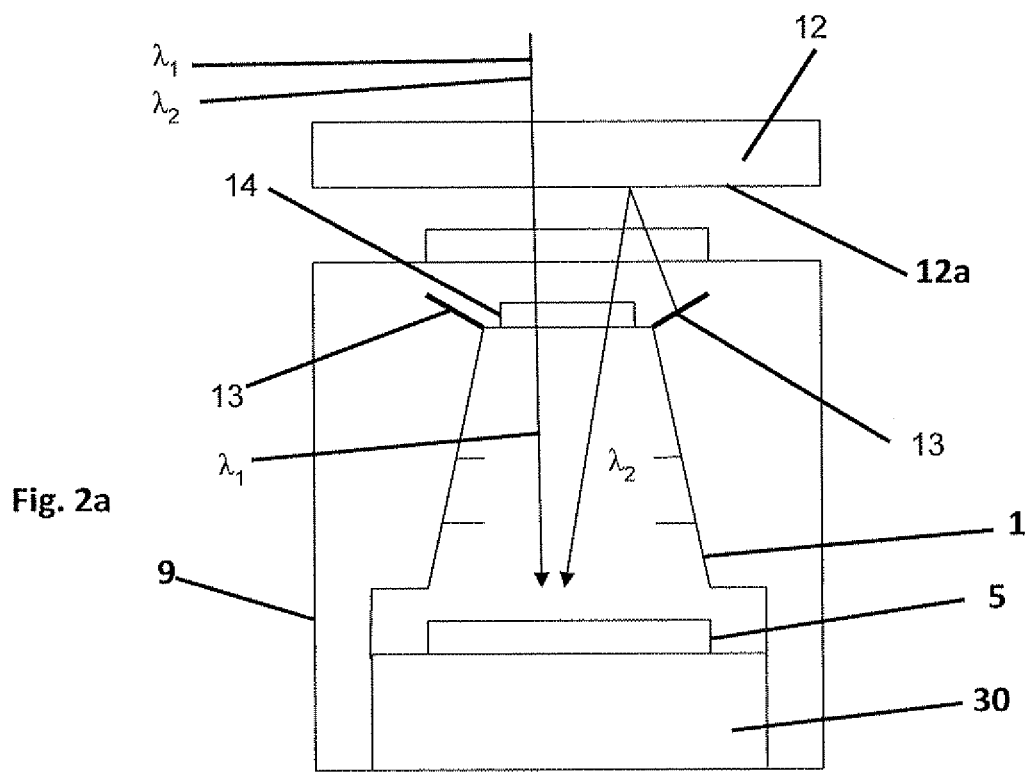
FIG. 2a illustrates a spectral filter outside the Dewar detector cooler with a reflecting surface for reflecting field of view at an undesired spectral range directed towards the cold shield to the detector.

FIG. 2a illustrates a system for controlling radiation provided to a cryogenically cooled detecting device equipped with a cold shield 1. The detecting device detects the incoming radiation from a certain field of view, spanning at least the sum total of the spectral ranges to be imaged in the different modes of operation. A removable interference filter 12 is disposed in proximity to DDC 9. It has a high transmittance for a first spectral range around a wavelength $\lambda_1$ and a substantially lower transmittance for a second spectral range, around a wavelength $\lambda_2$. Preferably, it highly reflects at the second spectral range. Anyhow, interference filter 12 prevents radiation at the second spectral range from arriving the detecting device. In one example, the high transmittance at $\lambda_1$ is higher than 70% and the low transmittance at $\lambda_2$ is lower than 20%.

Note that the blocked radiation may be defined by two parameters, the central wavelength $\lambda_2$, and a half bandwidth $\Delta\lambda$. It also may be defined by other pairs of parameters like lower and upper wavelengths defining a spectral range in between, or a central wavelength $\lambda_2$, and a bandwidth expressed in percent $\lambda_2$.

A blackened cooled skirt or crown 13 surrounds a coupling filtering window 14 of the cold shield. Surface 12a of filter 12 is a high reflector for the second spectral range. It reflects the field of view of cold shield 1, filtering window 14 and a cold skirt 13 back to the detecting device and into detector 5.

When removing or replacing filter 12, a window can be inserted or the focus of lenses shifted in order to accommodate the change in optical length.

Figure 2B:
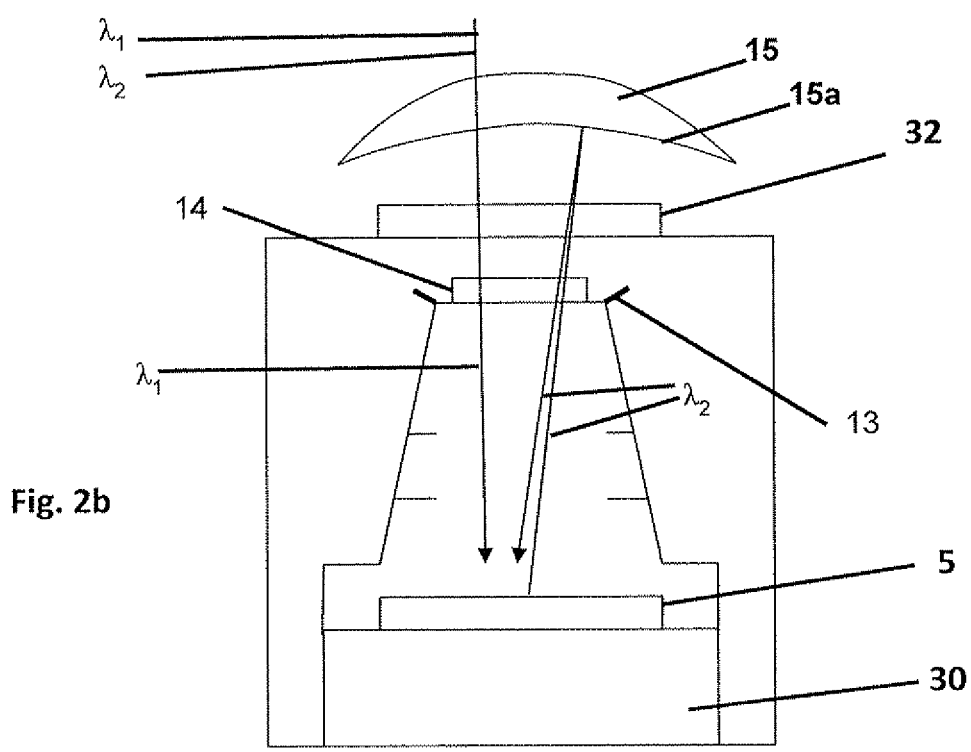
FIG. 2b depicts a concave element for reflecting field of view at an undesired spectral range directed towards the cold shield to the detector.

In the embodiment of FIG. 2b, the blocking filter is a lens 15 located in front of DDC 9. It has a concave surface 15a reflecting at the second spectral range. The focal length of the reflecting surface ensures that the cold shield is reflected back to detector 5 at. Thus, in this embodiment, skirt 13 may be smaller or absent.

Figure 3A:
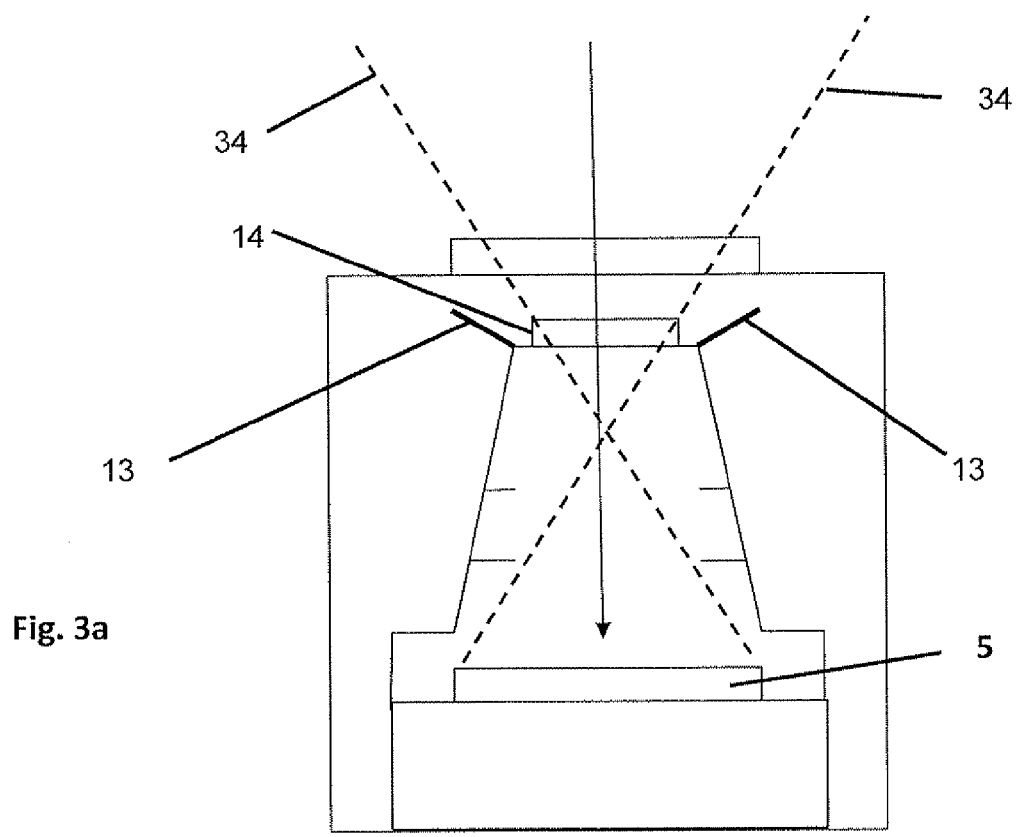
FIG. 3a is a schematic view of a detecting device having a cooled skirt to enlarge the reflecting field of view.
Figure 3B:
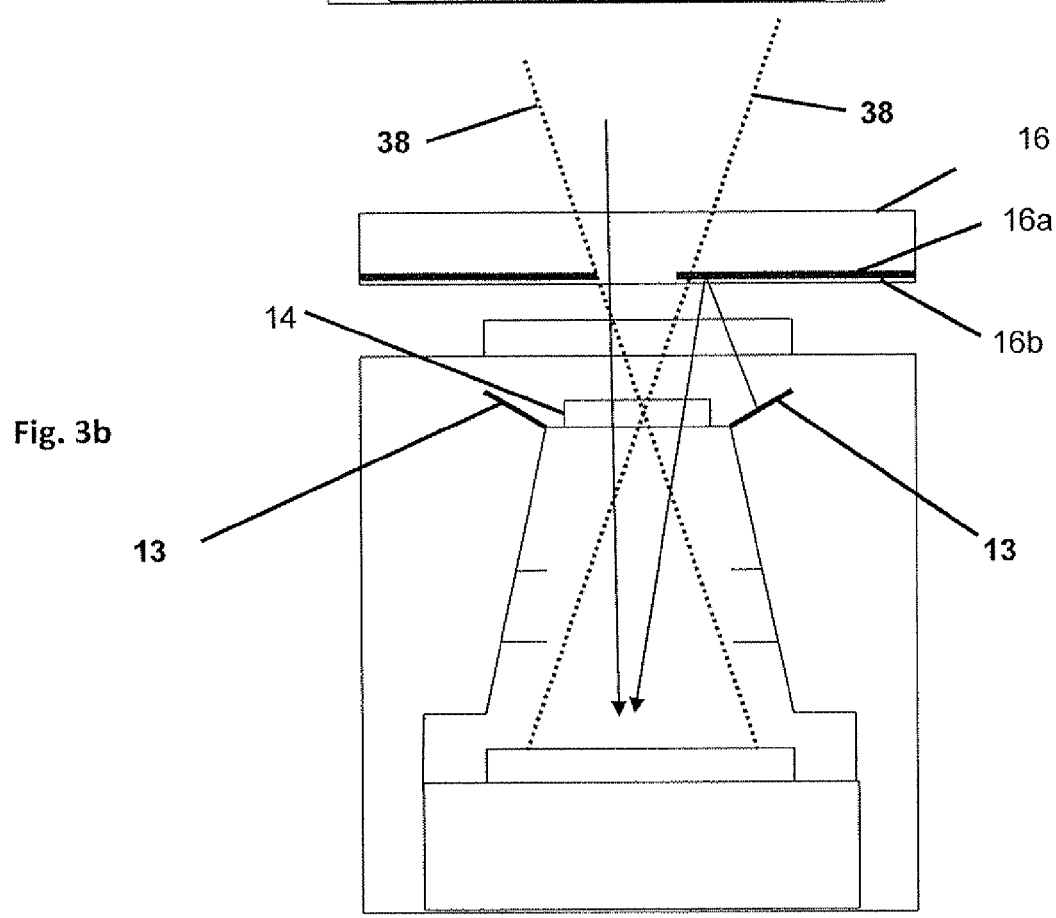
FIG. 3b shows the detecting device of FIG. 3a with an aperture element blocking a portion of the field of view.

Rather than blocking some spectral range, skirt 13 is useful when reduction of the field of view is desired. In the example of FIG. 3a, detector 5 gets incoming radiation from a broad field of view defined by boundary 34. To reduce the field of view from outside DDC 9, an aperture element 16 is disposed in front of the detecting device, as shown in FIG. 3b. Outside a central pupil, aperture element 16 has a blocking coating 16a on the side facing the incoming radiation, and a reflecting surface 16b facing the detecting device. Blocking coating 16a may be either a highly absorbing black coating or a highly reflecting surface. Consequently, the field of view is reduced and is limited by boundary 38. In other words, the effective F# of the detecting system is changed.

Radiation which is angularly compatible with the blocked radiation is reflected by surface 16b from cold shield 1, filtering window 14 and cold skirt 13, and arrives detector 5.

Note that rather than a plane aperture element, a concave aperture mirror, analogous to the one illustrated in FIG. 2b, may be placed in front of the Dewar 9.

Figure 4A:
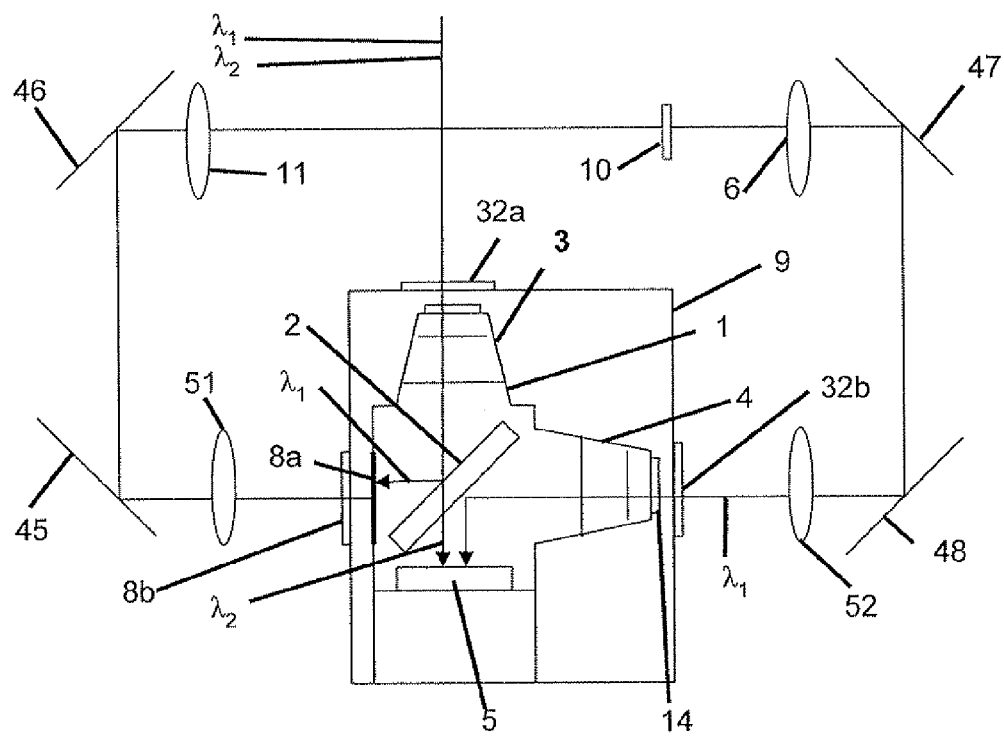
FIG. 4a illustrates a detecting device having an internal dichroic mirror and two arm channels for two spectral ranges.
Figure 4B:
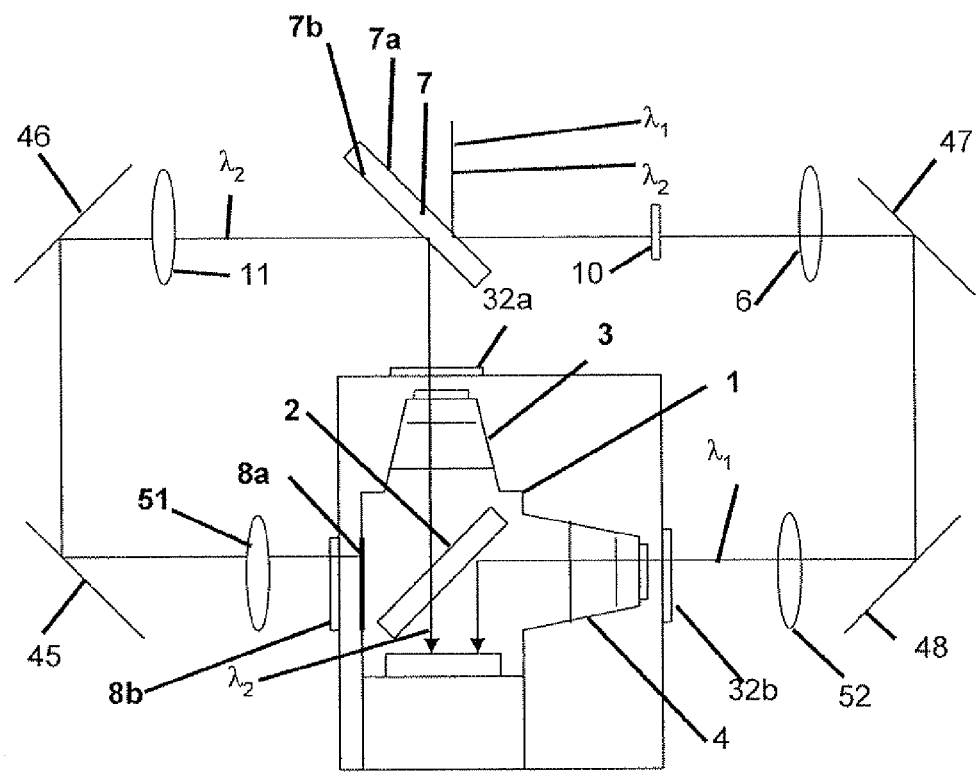
FIG. 4b depicts the detecting device of FIG. 4a, with a selective mirror for switching the detected spectral range.
Figure 5:
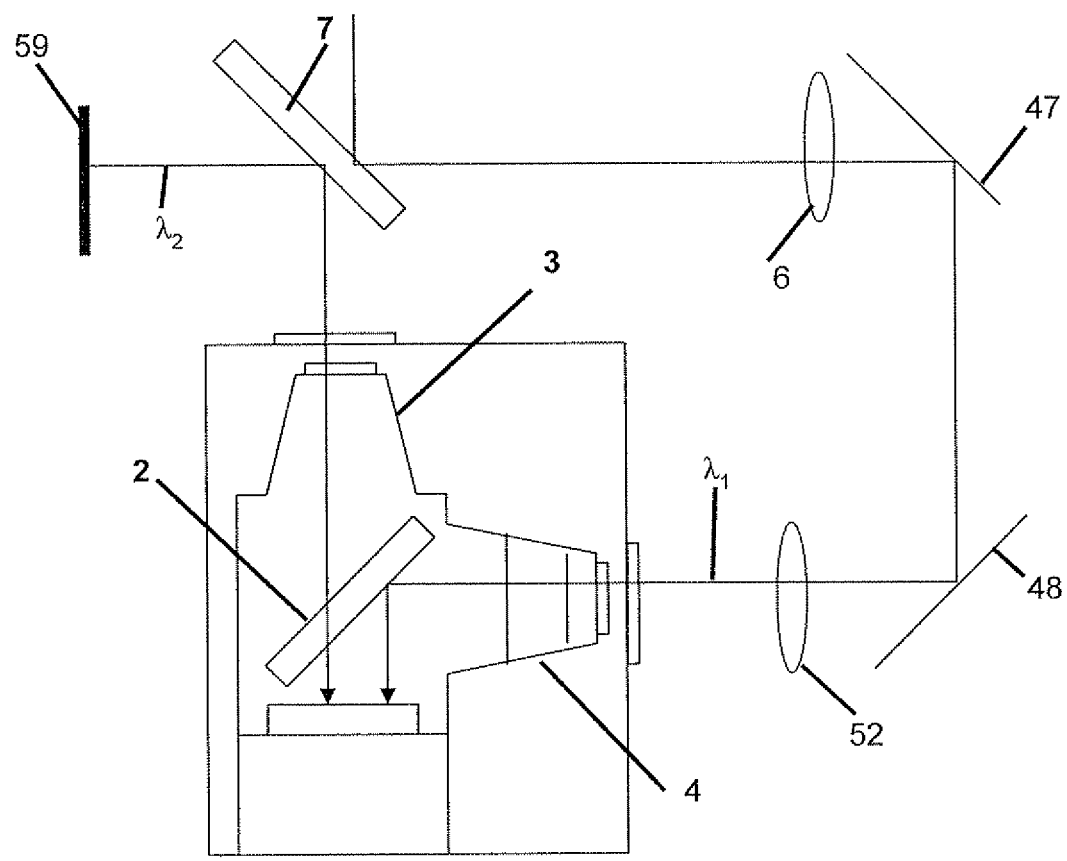
FIG. 5 is a schematic drawing of an optical system for switching spectral range of the detected radiation, whereas a thermoelectric cooler is used as the reflected cold surface.

Internal Dichroic Minor Inside a Double Channel Detecting Device (FIGS. 4a,4b,5)

In the embodiments of FIGS. 4a,4b and 5, a dichroic filter or mirror 2 is deployed within the cold shield, thereby defining two optical paths or channels to the detector with high sensitivity in different spectral ranges. This is combined with an optical path switching arrangement outside DDC 9 which ensures that, at any given time, one optical path to the detector sees the region to be imaged while the other receives a much smaller amount of radiation. Switching between the optical paths is typically achieved by inserting and removing a selective mirror 7.

An advantage of this approach is that in the optical path along which the detector is exposed to a spectral range it is not currently supposed to see, sees a blackened body with a very cold temperature, thereby reducing emitted radiation to insignificant levels. In order to maintain this advantage, it simulates the cold shield hatch on a blackened side panel 8a of cold shield 1. Likewise, in order to equalize the two paths, the right cold shield arm 4 should be at a similar distance from selective mirror 7 as the upper cold shield arm 3.

In more detail, dichroic mirror 2 is disposed inside cold shield 1 in front of an infra-red detector 5. Dichroic mirror 2 has a high reflectance at a first spectral range around $\lambda_1$ and a high transmittance at a second spectral range around $\lambda_2$. In the embodiment of FIG. 4a, radiation at the second spectral range is transmitted through dichroic mirror 2 to detector 5. At the same time, at the first spectral range, blackened side panel 8a is imaged onto detector 5. For that sake, panel 8a is imaged at the first spectral range through window 8b of vacuum cell 9, through lenses 51,11,6 and 52, mirrors 45,46,47 and 49, through windows 32b and 14, and through arm 4 of cold shield 1 and dichroic mirror 2 towards filter 5. Along the optical train, the aperture on arm 4 of the cold shield is imaged at 10.

In the embodiment of FIG. 4b, a removable mirror 7 is disposed outside cold shield 1 and vacuum cell 9. Mirror 7 has two reflecting coatings 7a and 7b of different spectral specifications disposed on its respective two sides. Coating 7a has a high reflectance at the first spectral range around wavelength $\lambda_1$, while it highly absorbs at the second spectral range around wavelength $\lambda_2$. Coating 7b has high reflectance at the second spectral range, and may absorb at the first spectral range.

To switch operational spectral range, mirror 7 is disposed in front of arm 3 at an angle of 45° to incoming radiation. As a result, the radiation at the first spectral range is reflected towards lens 6 and mirror 47, and is transmitted along an optical train which includes lens 6, mirror 47, mirror 48, lens 52 and windows 32b and 14. Finally it is reflected by dichroic mirror 2 onto detector 5.

Note that while the optical train between mirror 7 and arm 4 may be the same optical train used whenever mirror 7 is removed, as in FIG. 4a, it is possible to modify the optical train upon removal of mirror 7 to account for a different optical length. Such a modification is possible as it is done outside DDC 9.

At the second spectral range, cold panel 8a is imaged onto detector 5. To that aim, panel 8a is imaged at the second spectral range through lenses 51 and 11, mirrors 45, 46 and 7, windows 32a and 14, and is transmitted by dichroic mirror 2 onto detector 5.

Rather than imaging cold panel 8a, a thermo-electric cooler (TEC) 59 is imaged in the embodiment of FIG. 5 onto detector 5 at the second spectral range. Upon removal of mirror 7, TEC 59 is imaged at the first spectral range by lenses 6 and 52 onto detector 5.

Note that the detecting device of FIGS. 4 and 5, having an internal dichroic mirror and two arms of the cold shield for two respective optical channels, may be operated at switching spectral ranges by directing the appropriate arm towards the object desired for imaging or detection. In such an operational changeable mode, special care should be paid to decease substantially the entered radiation at the undesired spectral range. Rather than reflecting field of view at the undesired spectral range towards cold surfaces as described in the embodiments of FIGS. 2,4 and 5, one may achieve the decrease by other means.

A Method Embodiment for Changing an Operational Spectral Range (FIG. 6)

FIG. 6 is a flow chart of a method 60 for changing an operational spectral range of a cryogenically cooled infra-red detecting device. The method includes a step 61 of allowing transfer to the detector of incoming radiation at a desired spectral range, a step 62 of preventing transfer thereof at an undesired spectral range, and a step 63 of providing a reflecting field of view at the undesired spectral range directed towards at least one cold surface.

In some embodiments, the method includes a step 64 of placing outside the cold shield and a step 65 of removing a spectral filter. The spectral filter has a high transmittance at a first spectral range and a substantially lower transmittance for a second spectral range.

In some embodiments, the method includes a step 65 of placing/removing a reflective surface facing the detecting device for providing the detector a reflecting field of view at the second spectral range directed towards the cold shield.

In some embodiments, the method includes a step 66 of disposing a dichroic mirror inside the cold shield in front of an infra-red detector. The dichroic mirror has a high reflectance at a first spectral range and a high transmittance at a second spectral range. The detecting device includes a first arm and a second arm of the cold shield to accommodate respective optical channels for the first spectral range and for the second spectral range. Preferably, the method further includes a step 67 of placing outside the cold shield and a step 68 of removing a selective mirror, whereas the removable selective mirror has a high reflectance at the first spectral range. Preferably, the method includes a step 69 of furnishing an optical train for providing a reflecting field of view at the undesired spectral range directed towards cold surfaces.

It should also be understood that the steps of method 60 may be performed in any order or simultaneously, unless it is clear from the context that one step depends on another being performed first.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In particular, the present invention is not limited in any way by the examples described.

The invention claimed is:

1. An optical system comprising:
   (a) an infra-red detector disposed within a cryogenically cooled cold shield;
   (b) a spectral filter for allowing transfer to said infra-red detector of incoming radiation at a desired spectral range while preventing transfer thereof at an undesired spectral range;
   (c) said spectral filter being disposable into and removable from a position outside the cold shield, the disposing and removing of said spectral filter facilitating respective changes of the operational spectral range;
   (d) a surface of said spectral filter having high reflectance at said undesired spectral range while having high transmittance at said desired spectral range; and
   (e) the position of said spectral filter and said high reflectance of its surface being adapted for providing at the detector a reflected field of view at said undesired spectral range directed towards at least one cold blackened surface.

2. The optical system of claim 1, wherein the spectral filter has a high transmittance at a first spectral range and a substantially lower transmittance for a second spectral range.

3. The optical system of claim 2 wherein said high transmittance is higher than 70% and said low transmittance is lower than 20%.

4. The optical system of claim 1, wherein the optical system further includes a blackened cold skirt surrounding a coupling window of the cold shield and said reflective surface providing the detector a reflecting field of view directed towards the cold shield and said blackened cold skirt.

5. The optical system of claim 1 wherein said reflective surface is a concave reflecting surface facing the detecting device.

6. The optical system of claim 1 wherein a dichroic mirror is disposed inside the cold shield in front of a single infra-red detector, said dichroic mirror has a high reflectance at a first spectral range and a high transmittance at a second spectral range, and the optical system includes a first arm and a second arm of the cold shield to accommodate respective optical channels for directing said first spectral range and for said second spectral range towards said single infra-red detector.

7. The optical system of claim 6 wherein the system includes an optical train for providing a reflecting field of view at said undesired spectral range directed towards at least one cold surface.

8. The optical system of claim 7 wherein said at least one cold surface is a blackened surface of the cold shield.

9. The optical system of claim 7 wherein said at least one cold surface is a thermo-electric cooler disposed outside the cold shield.

10. A method for changing an operational spectral range of a cryogenically cooled infra-red detecting device, the device having an infra-red detector disposed within a cold shield, and being adapted for receiving incoming radiation, the method comprising:
    (a) placing a spectral filter outside the cold shield for changing an operational spectral range of the detecting device, a surface of said spectral filter having high reflectance at an undesired spectral range while having high transmittance at a desired spectral range. said spectral filter adapted for:
       (i) transferring to the detector incoming radiation at said desired spectral range;
       (ii) preventing transfer thereof at said undesired spectral range; and
       (iii) providing at the detector a reflected field of view at said undesired spectral range directed towards at least one cold blackened surface by said surface of said spectral filter;
    and
    (b) removing said spectral filter.

11. The method of claim 10 wherein the method includes disposing, a dichroic mirror inside the cold shield in front of single infra-red detector, said dichroic mirror has a high reflectance at a first spectral range and a high transmittance at a second spectral range, and the detecting device includes a first arm and a second arm of the cold shield to accommodate respective optical channels for directing said first spectral range and for said second spectral range towards said single infra-red detector.

12. The method of claim 11 wherein the method includes providing an optical train for providing a reflecting field of view at said undesired spectral range directed towards at least one cold surface.

* * * * *